United States Patent [19]

Griswold

[11] E Re. 30,185

[45] Reissued Jan. 8, 1980

[54] TRENCH SHORING ASSEMBLY

[76] Inventor: James L. Griswold, 513 Morningside Dr., Battle Creek, Mich. 49015

[21] Appl. No.: 894,770

[22] Filed: Apr. 10, 1978

Related U.S. Patent Documents

Reissue of:

[64] Patent No.: 4,019,329
Issued: Apr. 26, 1977
Appl. No.: 656,145
Filed: Feb. 9, 1976

[51] Int. Cl.[2] ..... E21D 5/12

[52] U.S. Cl. ..... 405/283; 405/272

[58] Field of Search ..... 61/41 A, 39.1; 403/63, 403/104, 108, 378, 379; 405/283

[56] References Cited

U.S. PATENT DOCUMENTS

| | | | |
|---|---|---|---|
| 1,235,468 | 7/1917 | Hawks | 403/63 |
| 2,922,283 | 1/1960 | Porter | 61/41 A |
| 3,668,874 | 6/1972 | Krings | 61/41 A |
| 3,750,409 | 8/1973 | Orfei | 61/41 A |
| 3,782,126 | 1/1974 | Pavese | 61/41 A |
| 3,937,026 | 2/1976 | Krings | 61/41 A |

FOREIGN PATENT DOCUMENTS

| | | | |
|---|---|---|---|
| 801474 | 1/1951 | Fed. Rep. of Germany | 61/39.1 |
| 818859 | 8/1959 | United Kingdom | 61/41 A |
| 1212361 | 11/1970 | United Kingdom | 61/41 A |

*Primary Examiner*—Dennis L. Taylor
*Attorney, Agent, or Firm*—McGlynn and Milton

[57] ABSTRACT

This invention relates to a trench shoring assembly which includes a pair of spaced-apart side walls for vertical disposition within a trench. Spreader pipes and spreader collars interconnect the side walls and allow limited pivotal movement between the side walls. Each side wall includes outer and inner metal plates connected to a horizontally extending hollow top beam which extends longitudinally along the top of the side wall, two intermediate beams parallel the hollow metal-beam and a bottom beam. A hardwood insert is disposed within the top beam to prevent the collapse of the hollow metal beam. A number of hollow beams extend perpendicularly to the horizontal beams and ribbed members extend perpendicularly to the horizontal beams. The side walls of the assembly have a tapered bottom portion which defines a triangularly shaped pointed lower extremity extending between the ends of the bottom portion. A metallic bar is disposed at the pointed lower extremity and extends between the ends of the bottom portion and protects the bottom of the side wall against abrasion. A U-shaped member is welded to the main frame, and in turn, a spreader collar is welded to the U-shaped member so that a force applied to the spreader collar is transferred directly to the main frame. Each spreader pipe spaces the side walls apart between two spreader collars to which the spreader pipe is attached by spreader pins. Lifting rings are slidably attached to the spreader pipes for lifting the assembly. A plurality of flanges extend from a spreader pipe and are connected by locking pins to mating flanges which extend from another spreader pipe of another vertically stacked trench shoring assembly.

19 Claims, 10 Drawing Figures

TRENCH SHORING ASSEMBLY

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a trench shoring assembly and, in particular, to a trench shoring assembly known as a trench box.

Trench boxes are typically used in excavation work when pipe is being laid, such as sewer or drain conduit. Basically, a trench box consists of two walls spaced apart a fixed distance from each other by a plurality of spreader devices affixed to and perpendicular to each side wall. Assembled trench boxes are positioned in an excavated hole or trench and pipe is laid within the trench box and after each length of pipe is laid the trench box is moved along the trench for laying the next length of pipe. The side walls of the trench box keep the excavation free from earth which has a tendency to fall or cave into the excavated hole or trench before and during the laying of the pipe.

Prior trench boxes are typically rigid. That is, the spreader pipes rigidly interconnect the spreader walls when in use. Rigid trench boxes often stick in the ground due to the side wall pressures from caved in earth during normal trench box lifting-out procedures. A rigid trench box is also difficult to [position ] *position* within an excavated trench.

Some trench shoring devices allow for complete pivotal movement between the spreader pipes and the side walls while the trench box is being positioned within the trench but, upon being positioned within the trench, the spreader pipes and the side walls are then rigidly attached or made rigid.

In accordance with the subject invention, there is provided a trench shoring assembly including a pair of spaced wall means for vertical disposition within a trench and connecting means interconnecting the spaced wall means for allowing limited pivotal movement between the spaced wall means.

The present invention, therefore, provides a trench box whose side walls can move to a limited extent vertically relative to one another. That is, one of the side walls may be raised in relation to the other. In this way, the trench box will lift out of the hole with much less effort than a rigid trench box, and also the trench box will not stick in the ground due to the side wall dirt pressures since, if one of the side walls become stuck due to side wall pressures, the opposite side wall can be moved upward to "walk" the trench box out of the trench.

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
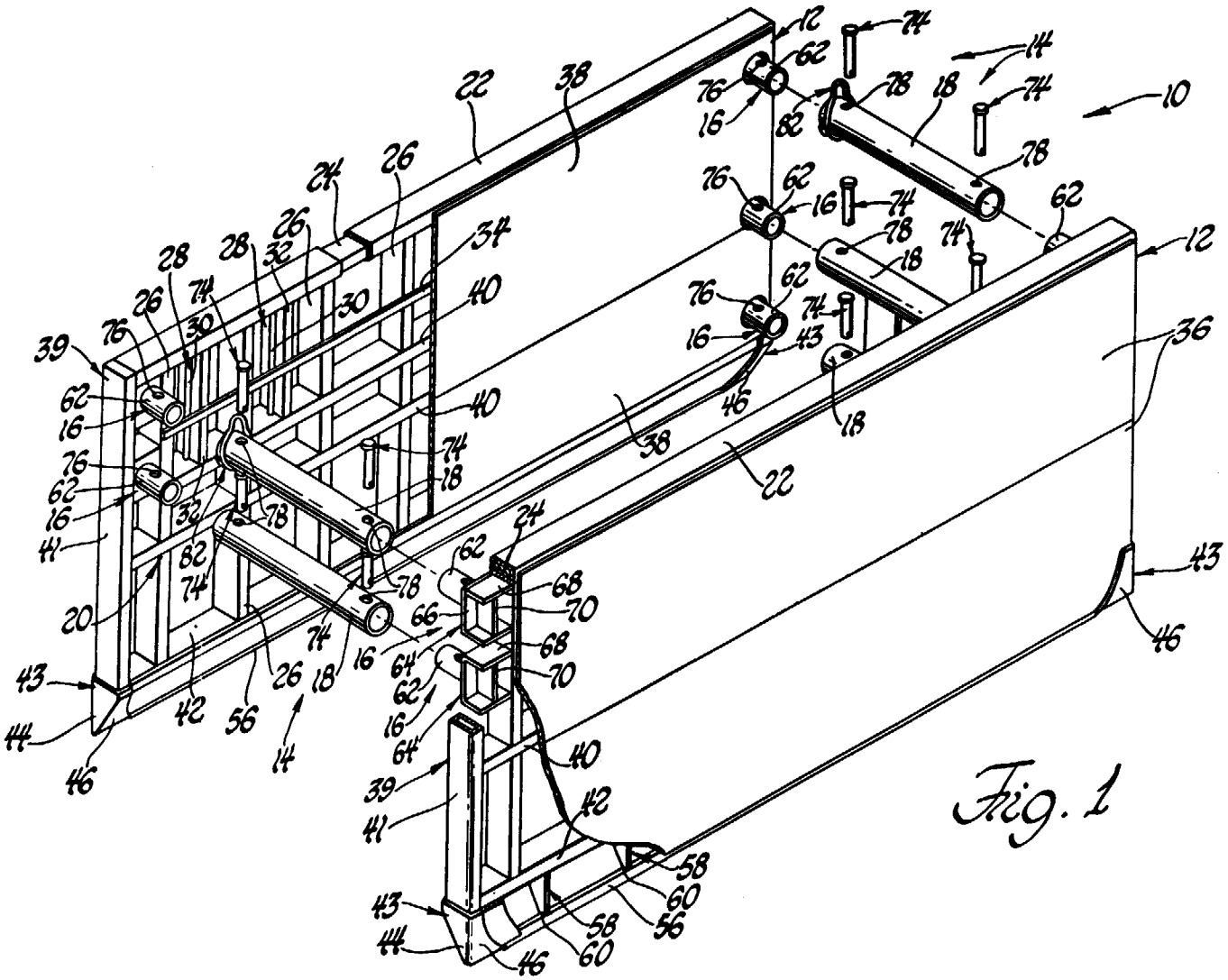
FIG. 1 is a perspective view partially broken away and in cross section of a trench shoring assembly constructed in accordance with the subject invention.
Figure 2:
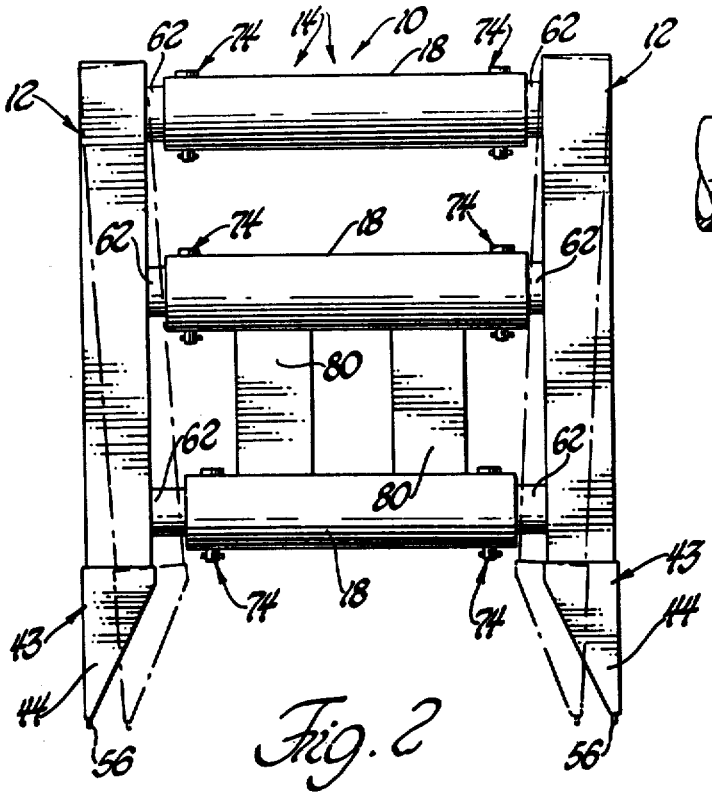
FIG. 2 is a front view of the trench shoring assembly showing relative movement between the side walls and the connecting means in phantom.

Referring now to the drawings, a trench shoring assembly or trench box assembly constructed in accordance with the subject invention is generally shown at 10 in FIGS. 1 and 2. The trench box assembly 10 includes a pair of identically constructed spaced wall means or side walls each generally indicated at 12. The side walls 12 are disposed vertically within a trench to prevent cave-in of the side walls of the trench or hole as pipe is laid between the side walls 12.

The trench box assembly 10 also includes connecting means generally shown at 14 for allowing limited pivotal movement between the side walls 12. The limited pivotal movement allowed between the side walls 12 is illustrated in phantom in FIG. 2. The connecting means 14 includes support means generally shown at 16 which are rigidly attached to each of the side walls 12. Spreader means comprising the cylindrical spreader device or pipes 18 extend between the support means 16 and space the side walls 12 apart.

As illustrated in FIG. 1, each side wall 12 is defined by interconnected structural members which define a main frame generally indicated at 20. Many of the structural members defining the frame 20 are hollow metal beams generally rectangular in cross section with rounded corners. One of the hollow structural metal beams is a top beam 22 which extends longitudinally along the top of each side wall 12. A force transferring means such as a hardwood insert 24 is disposed within the top beam 22 for preventing the collapse of the top beam 22. When the trench box assembly 10 is placed in a trench, the top of the side walls 12 are pounded to drive the side walls into the earth. The hardwood insert 24, which could be made of other equivalent materials, prevents the collapse of the top beam 22 and transfers such forces to the remaining frame members.

The frame 20 further includes vertical hollow beams 26 which extend perpendicularly to and are connected to the top beam 22 and transfer the above-described pounding forces to the lower structural members. The frame also includes the solid ribbed plate members or ribbed members generally shown at 28 and which also extend perpendicularly to and are connected to the top beam 22. The ribbed plate member 28 provides additional structural support to the side walls 12 and are optional. Each ribbed plate member 28 includes a vertically extending ribbed portion 30 extending perpendicularly to the top beam 22 and a flanged portion 32 extending perpendicularly from the ribbed portion 30. A metal strip member 34 is attached by welding to the flanged portions 32 of adjacent ribbed members 28 to interconnect the ribbed members 28. The strip member 34 is also welded to the vertical beams 26.

A metal plate means is connected to the frame 20 at its inner and outer face. More particularly, the metal plate means includes one or more outer metal plates 36 and one or more inner metal plates 38 welded to the structural members of the frame 20, thereby rendering the interior of a side wall 12 air-tight.

The strip member 34 which is disposed approximately midway between the ends of the ribbed members 28, provides a greater surface area to which the upper inner metal plate 38 may be welded.

The frame 20 also includes intermediate horizontally extending beam members 40. The intermediate beam members 40 extend parallel to the top beam 22 and perpendicular to the vertical beams 26 to provide added structural strength to the frame 20. The ends of the side walls 12 are defined by vertically disposed hollow beam members generally shown at 39 which extend from the top of each side wall 12 to the top of the triangular bottom portion or lower extremity. These vertical structural members 39 are also generally rectangular in cross section and have rounded corners. The metal plates 36 and 38 are welded to the side of the vertical structural member 39, the edge of the metal plates 36 and 38 being disposed rearwardly from the end face 41 of the vertical structural member 39 as shown in FIG. 10.

Figure 5:
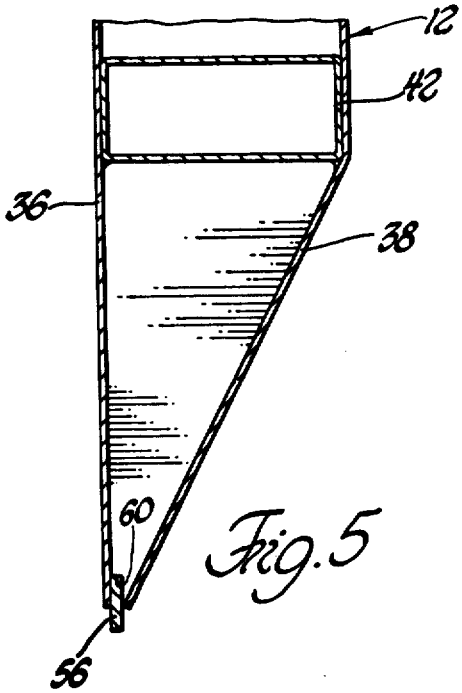
FIG. 5 is a fragmentary cross-sectional view showing the lower extremity of a side wall.

As seen in cross section in FIG. 5, each side wall 12 has a tapered bottom portion which defines a triangularly shaped pointed lower extremity. This pointed lower extremity extends between the ends of the side walls 12. One of the structural members of the main frame 20 is a horizontally extending bottom beam member 42 which extends horizontally along the bottom of the side wall 12 and above the triangularly shaped pointed lower extremity. A portion of the lower outer metal plate 36 extends vertically downwardly from the horizontally extending bottom beam member 42 and forms one side of the triangularly shaped pointed lower extremity. The bottom extremity of the lower inner metal plate 38 is bent inwardly to define the other side of the triangularly shaped lower extremity to thereby complete the triangular shape.

The trench box assembly 10 further includes guard means, such as corner shoes generally shown at 43 in FIGS. 1 and 2, which are disposed at each of the bottom corners or ends of the side walls 12. The corner shoes 13 are disposed at and encase each of the bottom ends of the side walls 12 thereby providing these bottom ends with protection against abrasion. The corner shoes 43 are made of cast or forged metal to provide the necessary durability to resist wear, as these corner ends of the side wall 12 often receive the greatest amount of wear due to dragging the trench box assembly 10 over rough surfaces such as gravel. The corner shoes 43 are comprised of a triangular member having a triangular front face 44 and side flanges 46 which extend rearwardly from the front face 44 along two sides of the front face 44. The two side flanges 46 come together at the bottom of the corner shoe to form a knife-like cutting edge to allow the lower extremity of the trench box assembly 10 to be more easily positioned into the ground. The side flanges 46 are disposed in overlapping relationship to the metal plates 36 and 38 and are disposed exteriorly of the metal plates 36 and 38. The corner shoes 43 are welded to the vertical beam 39 and the metal plates 36 and 38.

Figure 9:
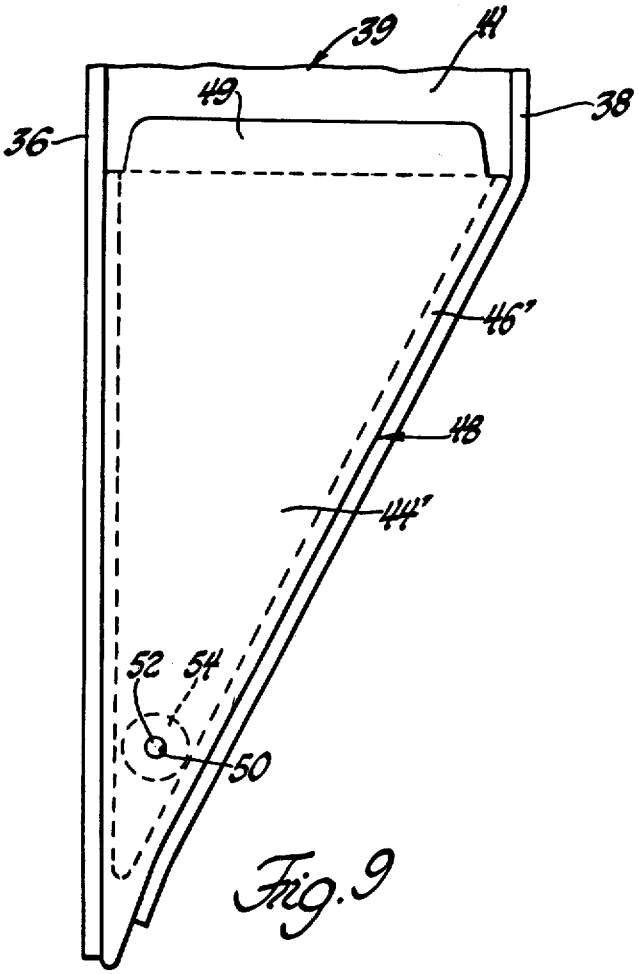
FIG. 9 is a fragmentary end view of the bottom end of a side wall showing a guard means disposed on the end of the lower extremity of the wall means.
Figure 10:
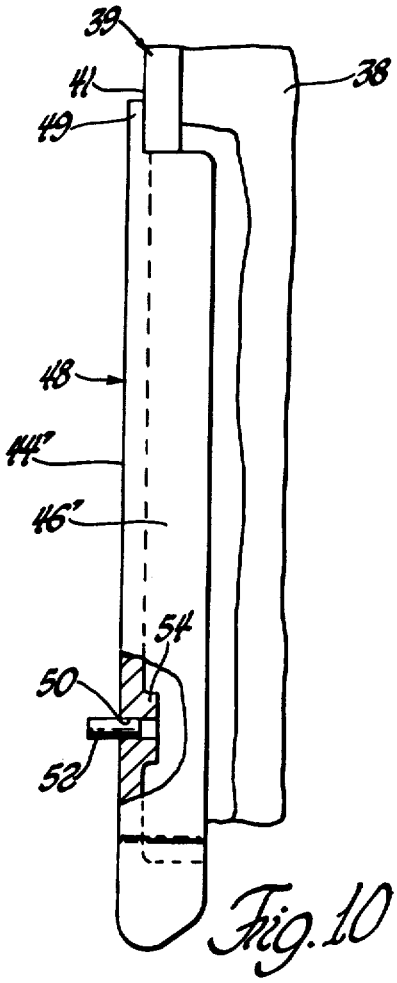
FIG. 10 is a fragmentary, cross-sectional, side view of the guard means of FIG. 9 disposed on the end of the lower extremity of the wall means.

Instead of corner shoes 43, the guard means may comprise an end gusset such as that generally shown at 48 in FIGS. 9 and 10. The end gusset 48 also includes a triangular front face or wall 44' and side flanges 46' which extend rearwardly from the front face 44' along two sides of the end gusset 48. The side flanges 46' of the end gussets 48 are disposed in overlapping relationship with the metal plates 36 and 38 and the side flanges 46' are disposed interiorly of the metal plates 36 and 38. The end gussets 48 also include a tongue 49 extending upwardly from the front wall 44' for overlapping the lower end of the adjacent vertical beam 39.

The end gusset 48 has a threaded hole 50 through the front face or wall 44', the hole 50 being in fluid communication with the interior of the side wall 12. As shown in FIGS. 9 and 10 removable plug means comprising a plug 52 is threadedly disposed in the hole 50 to prevent the flow of any fluid through the hole 50. The side walls 12 are fabricated so as to be water-tight, however, they may, after wear and tear, leak. As alluded to above, both the corner shoes 43 and the end gussets 48 are welded in watertight relationship to the vertical beams 39 and the metal plates 36 and 38. If water leaks into the side wall 12, the plug 52 may be removed to enable the water to drain out through the hole 50. The end gusset 48 is provided with a raised boss 54 at the back surface of the front face 44' and the hole 50 extends through the boss 54 to establish fluid communication with the interior of the side wall 12.

An abrasion protection means or metallic bar 56 is disposed at the pointed lower extremity of the side walls 12 and extends between the ends of the side wall 12. The metallic bar 56 protects the bottom of the side wall 12 against abrasion and preferably comprises "Suralloy 500" an 8630 modified steel. A plurality of triangularly shaped gusset plates, generally shown at 58, are horizontally spaced along the lower extremity and extend downwardly from the horizontally extending bottom beam member 42 to a pointed lower end. The pointed lower end of each gusset plate 58 has a notch 60 formed therein in which the metallic bar 56 is disposed. The gusset plates 58 are welded to and hold the metallic bar 56 at a number of positions along the lower extremity of the side wall 12 and the metallic bar 56 is also welded to and disposed between the outer metal plate 36 and the inner metal plate 38.

As described above, each side wall 12 includes interconnected structural members which define a main frame 20. The support means 16 is rigidly secured to the main frame 20 and is adapted to be connected to the spreader pipes 18 for transferring forces from the spreader pipes 18 directly to the main frame 20. The support means 16 includes a collar means or tubular spreader collar 62 and a backing plate means generally indicated at 64 in FIG. 1. The spreader collars 62 extend from the side walls 12 and are adapted to be connected to the spreader pipes 18, the spreader pipes 18 extending between a pair of opposed tubular spreader collars 62. The backing plate means 64 rigidly secures the spreader collars 62 to the main frame 20 whereby forces applied to the spreader collars 62 are transferred directly to the main frame 20. The backing plate means 64 includes a U-shaped member having a front wall 66 and spaced side flanges 68 which extend rearwardly from the front wall 66. The spreader collar 62 is welded to the front wall 66 and the side flanges 68 are welded to the main frame 20. The side flanges 68 extend rearwardly from the front member 66 along the top and bottom sides of the front wall 66. The upper side flange 68 of the upper U-shaped member adjacent the top beam 22 is welded to the front wall 66 and extends rearwardly. The side flanges 68 are rigidly secured to the main frame 20 and, in particular, to the verticle beam 39 and one of the verticle beams 26 by welding. The backing plate means 64 further includes rib means comprising plates or support ribs 70 which extend vertically between and are welded to the side flanges 68 for maintaining the position of the side flanges 68 relative to each other as shown in FIG. 1. The edges of the walls 66 and the flanges 68 are welded to the beam members of the frame 20. By providing so many welding points the U-shaped member and, consequently, the entire support means 16, is rigidly secured to the side wall 12 at its main frame 20.

Figure 3:
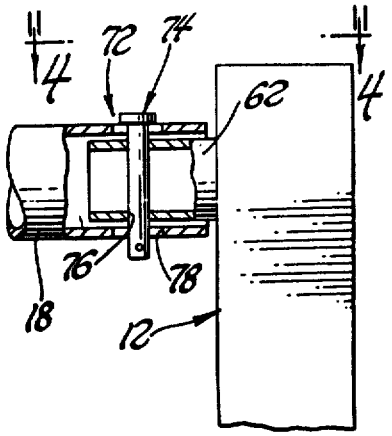
FIG. 3 is a fragmentary view partially broken away and in cross section showing the interconnection between a spreader pipe and a support means.
Figure 4:
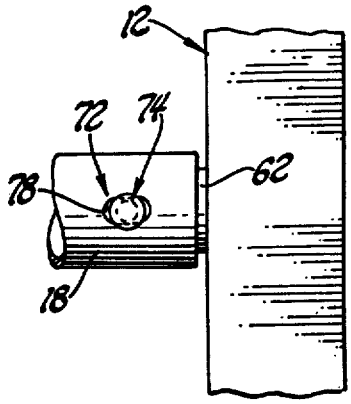
FIG. 4 is a fragmentary view taken substantially along line 4—4 of FIG. 3 and particularly showing the elongated slot formed in the spreader pipe.

The ends of the spreader pipes 18 overlap a portion of the spreader collars 62 as best illustrated in FIGS. 2, 3 and 4. The connecting means 14 includes a slot means generally indicated at 72 extending through the overlapping portions of the spreader pipes 18 and the spreader collars 62 as best illustrated in FIG. 4. Pin means generally indicated at 74 extend through the slot means 72 and attach the spreader pipes 18 to the spreader collars 62. As shown in FIG. 4, the slot means 72 is larger in part than the pin means 74 and allows the relative pivotal movement between the spreader collars 62 and the spreader pipes 18. In other words, the pin means 74 is allowed to move unencumbered to a limited extent along the slot means 72 in allowing the relative pivotal movement between the spreader pipes 18 and spreader collars 62. The slot means 72 includes a hole 76 extending through each spreader collar 62 and an elongated slot 78 which extends through the spreader pipes 18. The pin means 74 extend through both holes 76 and elongated slots 78 and thereby attaches the spreader pipes 18 to the spreader collars 62.

A brace means comprising a pair of horizontally spaced structural beams or plates 80 shown in FIG. 2 rigidly interconnect two adjacent spreader pipes 18. The plates 80 which extend vertically between the vertically spaced spreader pipes 18 are provided because the limited pivotal movement between the spreader pipes 18 and the spreader collars 62 causes the spreader pipes 18 to act as levers to produce a bending action on the spreader collars 62 which could break the spreader collars 62 off their respective backing plate means 64. The plates 80 tie two spreader pipes 18 together, the tied together spreader pipes 18 thereby exerting a straight pull or push action on the corresponding spreader collar 62 and not a bending action.

Figure 6:
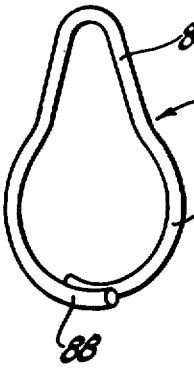
FIG. 6 is a front view of a ring member or lifting ring.
Figure 8:
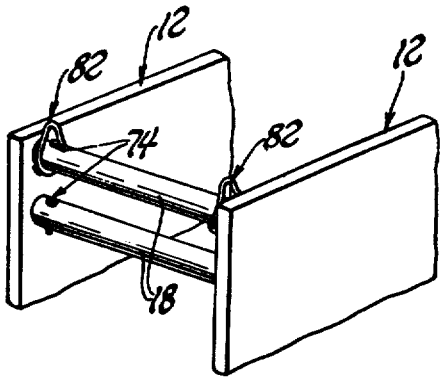
FIG. 8 is a fragmentary perspective view showing the lifting rings attached to the connecting means for lifting the trench shoring assembly.

As shown in FIG. 1 and in FIG. 8, lifting means comprising closed loop ring members generally shown at 82 are supported by the spreader pipes 18 and are provided for lifting the trench box assembly 10 upon being connected to a raising means such as a hook on a cable extending from a crane. The ring members 82 are slidably supported by the spreader pipes 18 so that the ring members 82 may be positioned at a number of positions along the spreader pipes 18. As can be best seen in FIG. 6, the ring members 82 include a large radius portion 84 which engages the spreader pipe 18 and a smaller radius portion 86 which may be connected to the hook on a cable extending from the crane. Each of the ring members 82 may be formed by bending a metal rod into the configuration shown until its ends 88 overlap. The overlapping ends 88 are welded together. These overlapping ends 88 are disposed along the large radius portion 84.

As previously noted, the pin means 74 interconnects the spreader pipes 18 and the spreader collars 62. The pin means 74 also limits the movement of the ring members 82 by only permitting the ring members 82 to move between themselves and their corresponding adjacent side wall 12 along the spreader pipes 18.

Figure 7:
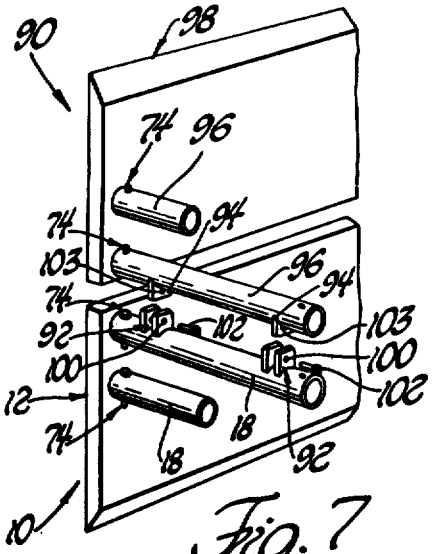
FIG. 7 is a fragmentary perspective view showing lug means interconnecting a set of stacked side walls.

FIG. 7 shows a second trench box assembly, generally shown at 90, stacked upon the identical trench box assembly 10. Lug means such as a plurality of flanges generally shown at 92 extend from the top-most spreader pipe 18 for attachment to mating lug means such as mating flanges 94 which extend from a cylindrical spreader pipe 96 of a second connecting means. The second connecting means is associated with a second pair of side walls generally shown at 98, only one of which is shown in FIG. 7. The flanges 92 have holes 100 therethrough for receiving locking pins 102 to interconnect the flanges 92 with the mating flanges 94 when the flanges 92 and 94 are aligned, the mating flanges 94 having holes 103 therethrough to also receive the locking pins 102. The flanges 92 include a pair of closely spaced flanges while the mating flanges 94 comprise a single flange 94 which is disposed between the closely spaced flanges 92. The locking pin 102 extends through the closely spaced flanges 92 and the single flange 94 to interconnect the flanges and, thereby interconnect the stacked trench box assemblies 10 and 90 at spreader pipes 18 and 96 respectively.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property of privilege is claimed are defined as follows:

1. A trench shoring assembly comprising a pair of spaced wall means for vertical disposition within a trench, and connecting means interconnecting said wall means for allowing limited pivotal movement between said wall means, said connecting means including a plurality of support means rigidly attached to each of said wall means adjacent each end thereof and extending from said wall means in opposite directions toward one another, a plurality of spreader means extending between opposed pairs of said support means for spacing said wall means apart, said spreader means overlapping a portion of said support means and including slot means extending through the overlapping portions of said spreader means and said support means, and pin means extending through said slot means for attaching said spreader means to said support means and being at least in part larger than said pin means for allowing said limited movement between said spreader means and said support means.

2. An assembly as set forth in claim 1 wherein said support means includes a plurality of tubular spreader collars extending from said wall means.

3. An assembly as set forth in claim 2 wherein said spreader means includes a plurality of spreader pipes each of which extends between a pair of said tubular spreader collars extending from adjacent wall means.

4. An assembly as set forth in claim 3 wherein the ends of each of the spreader pipes are disposed about and in said overlapping relationship with said spreader collars.

5. An assembly as set forth in claim 4 wherein said slot means includes holes extending through said spreader collars, and elongated slots extending through said spreader pipes.

6. An assembly as defined in claim 5 including brace means rigidly interconnecting two of said spreader pipes.

7. An assembly as set forth in claim 6 wherein said brace means includes a pair of horizontally spaced structural brace plates extending vertically between vertically spaced spreader pipes.

8. An assembly as set forth in claim 1 wherein said connecting means includes a plurality of spreader pipes and including brace means rigidly interconnecting two of said spreader pipes.

9. An assembly as set forth in claim 8 wherein said brace means includes a pair of horizontally spaced structural plates extending vertically between vertically spaced spreader pipes.

*10. A trench shoring assembly comprising: a pair of spaced apart wall means for vertical disposition within a trench and connecting means for connecting and maintaining said wall means in a generally parallel, spaced apart relationship; said connecting means including a plurality of support means rigidly attached to each of said wall means adjacent each end thereof and extending from said wall means in opposite directions toward one another, a plurality of spreader means extending between opposed pairs of said support means for spacing said wall means apart, and connecting means for loosely attaching the respective ends of said spreader means to said support means to permit limited pivotal movement between said wall means, said ends of said spreader means and said support means being in overlapping relationship with one another and defining a space therebetween to allow said pivotal movement.*

*11. An assembly as set forth in claim 10 including brace means for rigidly interconnecting at least one of said spreader means to another of said spreader means.*

*12. An assembly as set forth in claim 10 wherein said spreader means includes elongated, cylindrical pipes and said support means includes collar members adapted for overlapping relationship with said pipes.*

*13. An assembly as set forth in claim 12 including an overlapping portion between said pipes and said collar members, said connecting means attaching said pipes and collar members at said overlapping portion.*

*14. An assembly as set forth in claim 13 wherein the pipes and collar members include dimensions providing said space as an annular space between said pipes and collar members at said overlapping portion.*

*15. A trench shoring assembly comprising: a pair of spaced walls for vertical disposition within a trench; a plurality of tubular spreader members for maintaining said walls in generally parallel, spaced relationship; said walls including a set of opposed collar members for each of said spreader members for connecting said spreader members to said walls, the ends of said spreader members being received in overlapping relationship with said collar members; and connecting means for loosely attaching said spreader members to said collar members to permit limited pivotal movement between said walls.*

*16. An assembly as set forth in claim 15 wherein said spreader members and collar members have cross-sectional dimensions which are sufficiently different to provide a space therebetween where the members are in overlapping relationship.*

*17. An assembly as set forth in claim 16 including brace members for rigidly connecting at least one of said spreader members to another of said spreader members.*

*18. An assembly as set forth in claim 15 spreader means includes elongated, cylindrical pipes.*

*19. An assembly as set forth in claim 18 wherein said pipes and collar members have cross-sectional dimensions which are sufficiently different to provide a space therebetween where the members are in overlapping relationship and being preformed to coact with said connecting means to allow said limited pivotal movement.*

* * * * *